(12) United States Patent
Pochapsky et al.

(10) Patent No.: US 7,051,469 B1
(45) Date of Patent: May 30, 2006

(54) NIGHT SIGHT FOR USE WITH A TELESCOPIC SIGHT

(75) Inventors: Eugene Pochapsky, Cheswick, PA (US); Paul Maxin, Trafford, PA (US); William Welsh, Pittsburgh, PA (US)

(73) Assignee: Omnitech Partners, Freeport, PA (US)

( * ) Notice: Subject to any disclaimer, the term of this patent is extended or adjusted under 35 U.S.C. 154(b) by 0 days.

(21) Appl. No.: 11/011,671

(22) Filed: Dec. 14, 2004

(51) Int. Cl.
*F41G 1/00* (2006.01)
(52) U.S. Cl. ....................................................... 42/111
(58) Field of Classification Search .......... 42/111–148; D16/132; 359/399
See application file for complete search history.

(56) References Cited

U.S. PATENT DOCUMENTS

| | | | |
|---|---|---|---|
| 5,898,519 | A | 4/1999 | Palmer |
| 6,088,165 | A * | 7/2000 | Janeczko et al. ........... 359/629 |
| 6,608,298 | B1 | 8/2003 | Gaber |
| 6,624,414 | B1 | 9/2003 | Glesener |
| 6,724,131 | B1 | 4/2004 | Iosue |
| 6,747,258 | B1 | 6/2004 | Benz et al. |
| 6,765,352 | B1 | 7/2004 | Ohtomo et al. |

* cited by examiner

*Primary Examiner*—Michael J. Carone
*Assistant Examiner*—Gabe Klein
(74) *Attorney, Agent, or Firm*—Grant E. Coffield; Eckert Seamans Cherin & Mellott, LLC (57) ABSTRACT

A night sight includes a notched bottom portion, permitting the use of a large objective lens for maximized light gathering capability while also permitting the night sight to be mounted with its center line relatively close to the center line of the barrel of the weapon with which it is used. This configuration permits the night sight to be mounted so that its center line is the same as the center line of a daytime telescopic sight used in conjunction with the night sight. The night sight includes a focusing assembly having decreased sensitivity to tilt or decenter, and a collimator mounted within a spherical bearing so that the collimator may be precisely aligned during assembly of the night sight. The night sight thereby ensures that an image viewed through the night sight appears to originate from the same angle as that with which the image entered the objective lens, and further resists a need to compensate for parallax during aiming.

11 Claims, 6 Drawing Sheets

NIGHT SIGHT FOR USE WITH A TELESCOPIC SIGHT

BACKGROUND OF THE INVENTION

1. Field of the Invention

The present invention relates to night sights for firearms. More specifically, the present invention provides a night sight for use with a telescopic day sight, combining a large objective lens for maximum light gathering capability with the ability to mount the sight in line with the telescopic sight in a manner that resists parallax.

2. Description of the Related Art

The problem of aiming a firearm at night is often encountered by military and law enforcement personnel. The use of a light source to illuminate the target-whether visible light or infrared-has the disadvantage of indicating the location of the shooter. Laser aiming devices carry the same disadvantage. The use of tritium illuminated sights, while making the sights more visible, fails to illuminate the target even if the tritium—illuminated aiming reticle is within a telescopic sight providing light gathering and magnification. Accordingly, light gathering and intensifying night vision devices capable of being used as a firearm sight have been developed.

A typical night vision sight utilizes an objective lens having a maximized size for maximum light gathering capability. After passing through the objective lens, light passes through a focusing assembly that is used to vary the distance light travels between lenses within the sight by moving either a focal length adjust lens with respect to the objective lens, or a mirror within the night vision device along an axis to change the length of the light path. The light will therefore be brought into sharp focus on the photosensitive surface of the image intensifier.

A photocathode having an electrical current flowing therethrough which forms the photosensitive surface of the image intensifier converts the optical image into an electronic image that is transmitted through an electron flow. The electrons are accelerated through the image intensifier, and remain focused because of the close proximity of surfaces within the image intensifier tube. Acceleration of the electrons, combined with a microchannel electron-multiplying plate, result in intensification of the original image. When the electrons reach a screen, the electronic image is converted to an optical image. The final, amplified visible image is displayed to the shooter or to other optical devices within the night sight.

The output image the image intensifier may be presented to the collimator. The collimator presents the image to the shooter in a manner so that it appears to originate from a long distance. The orientation of the collimator affects the degree to which the image transmitted by the collimator appears to originate from the same angle at which it entered the objective lens. Installation of the collimator during assembly must therefore be precise.

It is generally desirable to mount a firearm sight as close as possible to the barrel to limit parallax. However, the size of the objective lens desired for maximum light gathering requires some distance between the center line of the sight and the center line of the barrel. Additionally, if the night sight is used in conjunction with the daytime telescopic sight, and if the daytime telescopic sight and night sight have different center lines, parallax will be introduced to the daytime telescopic sight, which is not detectable through the daytime telescopic sight, thereby resulting in a different point of impact than what would be expected by viewing through the daytime telescopic scope.

Some night sights attempt to combine a daytime telescopic scope and a night sight into the same sight. Many of these devices use two optical paths, one used during the day, and one for use at night. In addition to making the sight unnecessarily heavy, the use of two optical paths creates a likelihood of differences between point of aim and point of impact from one optical path to the other.

Other night vision devices utilize a removable image intensifier tube to permit use of the night sight as a day sight. However, image intensifier tubes are delicate instruments, subject to damage when removed. Furthermore, a temperature difference between the image intensifier and the scope upon insertion of the image intensifier may cause fogging of the sight.

Other night vision sights utilize an image intensifier moved within the housing from a position within the sight's light path to a position outside the sight's light path depending on whether the sight is being used during the day or at night. Such systems may also require the movement of the objective lens and the eye piece lens assembly in conjunction with the image intensifier tube so that the daytime optics move outward as the image intensifier tube is moved therebetween, thereby maintaining the proper focal distance for the daytime optics. Such movement of both the daytime optics and the image intensifier tube raises the issue of the repeatability of these movements.

Accordingly, there is a need for a night sight that may be mounted on a weapon with its center line close to the center line of the barrel of the gun, while maximizing the size of the objective lens, thereby maximizing light gathering while minimizing parallax. There is a further need for a night sight that may be used with a daytime telescopic sight, and having the same center line as the daytime telescopic sight when mounted on a weapon. There is an additional need for a night sight that presents an image to a daytime telescopic sight at the same angle at which the image entered the objective lens of the night sight. There is a further need for a night sight that may be mounted in front of a daytime telescopic sight without the need for resighting in the weapon. There is an additional need for a night sight that is assembled in a manner that ensures accurate, stable alignment of the various components of the sight.

SUMMARY OF THE INVENTION

The present invention provides a night vision sight for firearms for installation between a daytime telescopic sight and the target. The night sight features a large objective lens having a cutaway bottom portion to permit mounting the night sight sufficiently close to the weapon so that the center line of the night sight and the daytime telescopic sight are the same, thereby resisting parallax. As used herein, a cutaway section and/or cutaway bottom portion is defined as a section of the objective lens having a shape other than round, and wherein the distance between the edge of the lens and the center of the lens is less than the radius of the remainder of the lens, or if the remainder of the lens is other than round, then the distance from the center to the bottom edge is less than the distance from the center of the lens to at least one other portion of the lens. Additionally, the night sight is assembled in a manner that ensures that an image viewed through the night sight appears to originate from substantially the same angle at which the image entered the objective lens, thereby further resisting parallax. A projected image appears to originate from substantially the same angle at which it entered the objective lens if the angle at which the image entered the objective lens and the angle at which the image appears to originate to a shooter viewing the image through the night sight are sufficiently close so that, at normal shooting distances, a shooter need not adjust his point of aim as a result of the difference in the angles.

The night sight includes an objective lens housing having the objective lens and a focusing assembly therein. An image intensifier is located behind the focusing assembly. A collimator is located behind the image intensifier, within the rear portion of the night sight's housing. The night sight's housing further includes a mount for securing the night sight to a weapon, with a preferred mount being structured to mate with a universal sight rail such as a Weaver rail.

Light forming an image passes through the objective lens at the front of the night sight. The large portion of the objective lens maximizes its light gathering capability and also permits longer focal lengths, increasing the maximum resolution of the system. After passing through the objective lens, the light will pass through the focusing assembly having at least one focus lens mounted within a focus lens tube. The focus lens tube is slidably mounted within a focus sleeve. The interaction of the focus lens tube and focus sleeve is structured to minimize image shift caused by shifting or tilting of the focus lens tube within the focus lens sleeve. The clearance between these two components is sufficient to allow the focus lens tube to slide within the focus sleeve, while minimizing tilting of the focus lens tube. The surface finish of the exterior of the focus lens tube and the interior of the focus sleeve is sufficiently smooth to facilitate sliding. Sliding is further facilitated by using materials of different hardness or lubricity for these components. Use of a low diopter focus lens decreases the sensitivity of the focusing assembly to tilt, rotation, or decentration of the focus lens. The focus lens tube and focus sleeve are lengthened with respect to prior art devices, thereby further minimizing the maximum angle at which the focus lens tube may tilt at a given clearance between the focus lens tube and the focus sleeve. The focus lens is moved linearly as needed to bring the image into sharp focus on the photocathode of the image intensifier.

The photocathode which forms the photosensitive surface of the image intensifier converts the optical image into an electronic image that is transmitted through an electron flow. The electron flow is amplified by a microchannel plate and proximity focused to a phosphor screen. The amplified electronic image is then converted back to an optical imageby the phosphor screen. The final, amplified visible image is displayed on the inverted fiber optic output display. The image intensifier thereby forms an amplified, upright visible version of the image on its inverting fiber optic output display, which then presents the image to the collimator.

The image intensifier is rigidly restrained within an image intensifier mount, wherein the image intensifier is suspended by an elastomer in a rigid shell, with sufficient thickness to allow the image intensifier to be rigidly held without sagging, and to resist movement due to temperature changes and deformation of the image intensifier within its sleeve. Suspending the image intensifier using the elastomer also protects the image intensifier from shock. The use of the elastomer within the sleeve permits the use of a high mounting force, by distributing the force over the entire surface of the tube, thereby ensuring that the image intensifier remains precisely located in the correct position within the housing.

The collimator causes the projected image to appear to originate from the same angle at which it entered the objective lens, from a long distance away. The collimator is fitted within a spherical bearing that is centered at the center of curvature of the image intensifier's concave output surface. The use of the spherical bearing permits adjustment of the angle at which the displayed image appears to emerge from the collimator during assembly, so that the projected image appears to originate from substantially the same angle at which it entered the objective lens. The focal length adjust lens is adjusted during assembly to match the objective lens focal length and to compensate for any magnification within the image intensifier so that the magnification is exactly unity and the projected image appears to emerge from substantially the same angle at which it entered the objective lens for any relative orientation of the night sight and daytime telescopic sight.

In use, the night sight may be mounted directly in front of a daytime telescopic sight by attaching the mount to a universal sight rail. Universal sight rails such as Weaver rails are commonly provided on firearms. The center line of the night sight is set to be substantially the same as the typical centerline of a conventionally-mounted daytime telescopic sight. Therefore, the image presented to the daytime telescopic sight by the night sight appears to come from substantially the same angle as it entered the objective lens of the night sight. Therefore, the same point of aim may be utilized regardless of whether the night sight is present. The night sight may be installed and removed without the need to re-sight-in the weapon. The night sight may be installed at different relative orientations with respect to the daytime telescopic sight.

It is therefore an object of the present invention to provide a night sight having a large objective lens, but that may be mounted with a centerline close to the barrel of a weapon.

It is another object of the invention to provide a night sight having a large objective lens that may be mounted so that its center line is the same as the center line of a daytime telescopic sight with which the night sight is used.

It is a further object of the invention to provide a night sight having a focusing assembly with minimized sensitivity to tilt, decenter, and rotation of the mechanism.

It is another object of the invention to provide a focus lens assembly that limits the mass of the items that must be moved to focus the night sight.

It is a further object of the invention to provide a night sight having an image intensifier tube mounted with a high mounting force distributed over substantially the entire surface of the image intensifier tube, thereby providing precise, rigid mounting without deformation of the tube.

It is another object of the invention to provide a night sight having an image intensifier mounting structure that compensates for different coefficients of thermal expansion within the materials used for the various components therein.

It is a further object of the invention to provide a night sight that minimizes the total surface area that is viewable from a downrange observer.

It is another object of the invention to provide a night sight that ensures that the image presented to the shooter appears to originate from the same angle at which the image entered the objective lens of the night sight.

It is another object of the invention to provide a night sight that ensures that the image presented to the shooter appears to originate from the same angle at which the objective lens of the night sight when the rails mounting the night sight and daytime telescopic sight have different relative orientations.

These and other objects of the invention will become apparent through the following description and drawings.

BRIEF DESCRIPTION OF THE DRAWINGS

Like reference characters denote like elements throughout the drawings.

DETAILED DESCRIPTION OF THE PREFERRED EMBODIMENTS

The present invention provides a night sight having a structure that permits the center line of the night sight to be mounted close to the center line of a barrel of a weapon with which the night sight is utilized, while also providing a large objective lens for maximized light gathering capability. The invention further provides a night sight having a structure that minimizes parallax.

Figure 1:
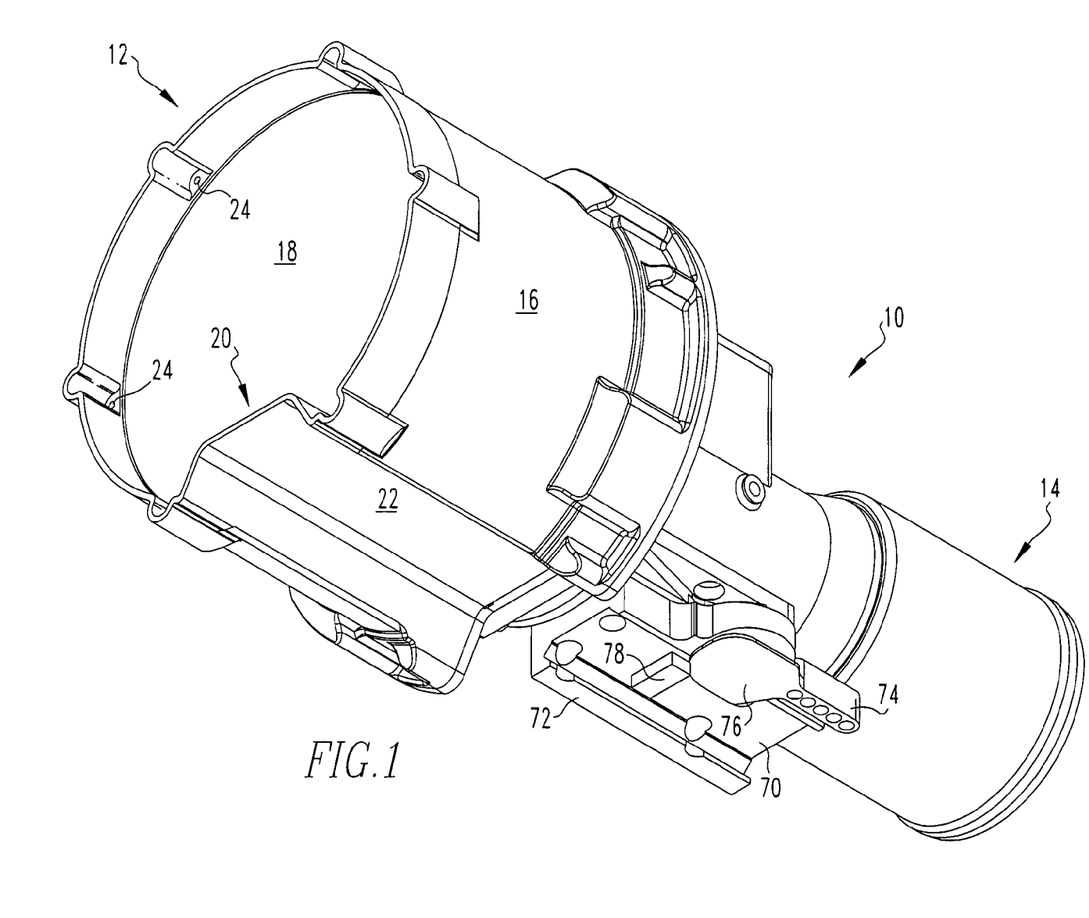
FIG. 1 is an isometric side and bottom view of a night sight according to the present invention.
Figure 2:
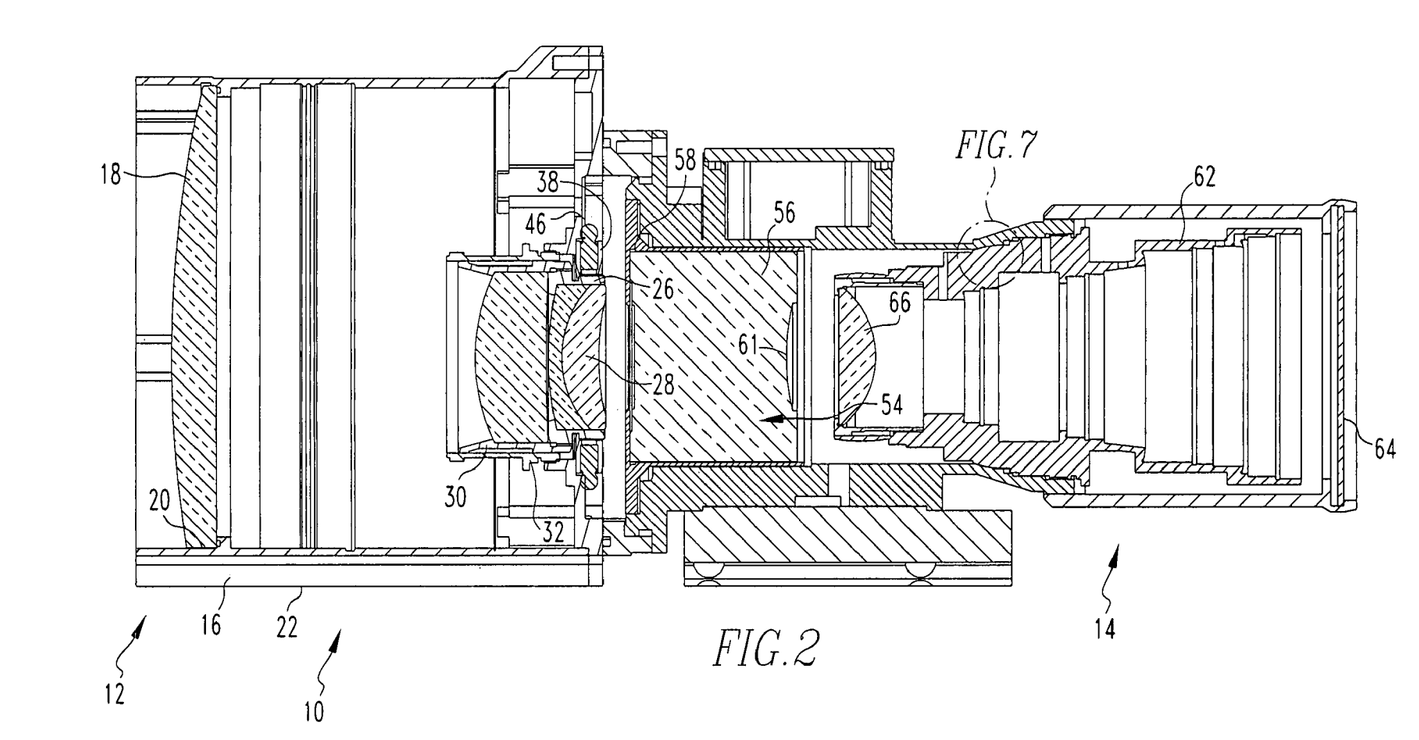
FIG. 2 is a cross-sectional side view of a night sight according to the present invention.

Referring to FIGS. 1 to 2, a night sight 10 is illustrated. The night sight 10 includes a forward end 12 which faces the target in use, and a back end 14 through which a shooter may view an image through the night sight 10, possibly through a daytime telescopic sight. A housing 16 holds the components of the night sight 10. An objective lens 18 is secured within the forward end 12. The objective lens 18 defines a cutaway section 20 along its bottom edge, corresponding to the cutaway section 22 defined along the bottom of the housing 16. The objective lens 18 is preferably held in sealing engagement with the housing 16 by a plurality of axial sealing screws 24, with the illustrated embodiment including six axial sealing screws 24. In a conventional night sight, the objective lens is threadedly secured within the housing, which cannot accommodate an objective lens having a cutaway portion. The objective lens 18 may either be a catadioptric lens, a presently available lens incorporating both glass elements and mirrors within its design, or a refractive lens.

Figure 3:
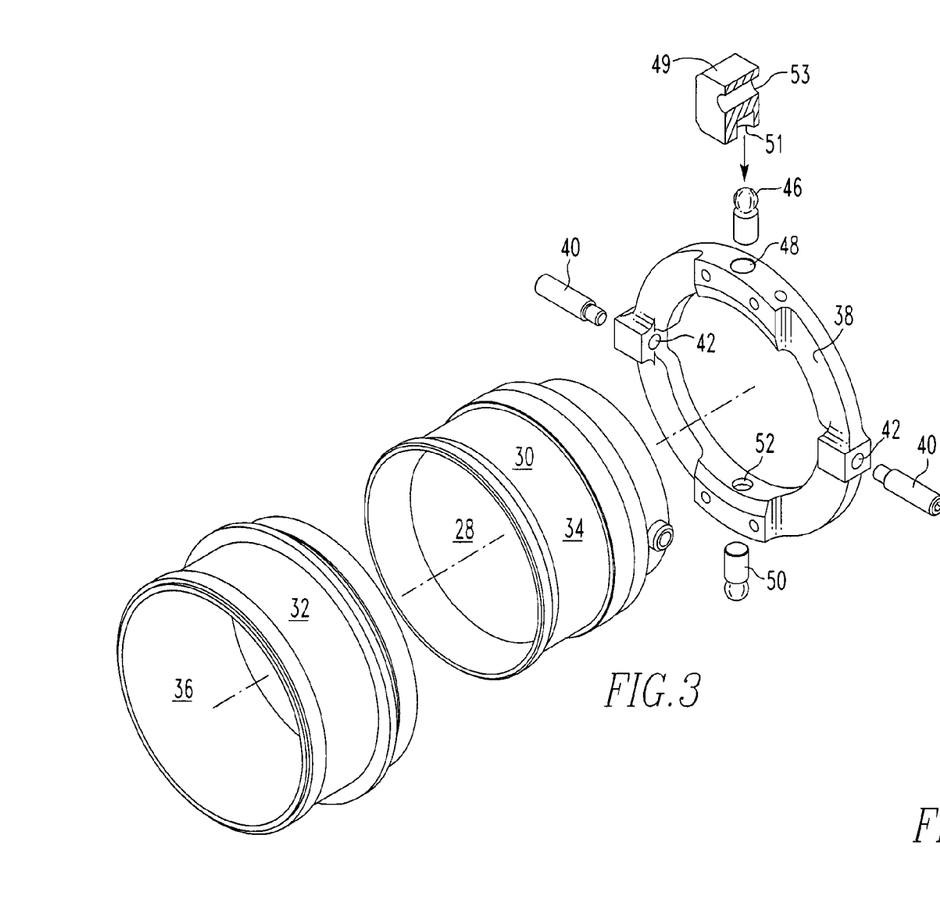
FIG. 3 is an exploded isometric front and side view of a focusing assembly for a night sight according to the present invention.
Figure 4:
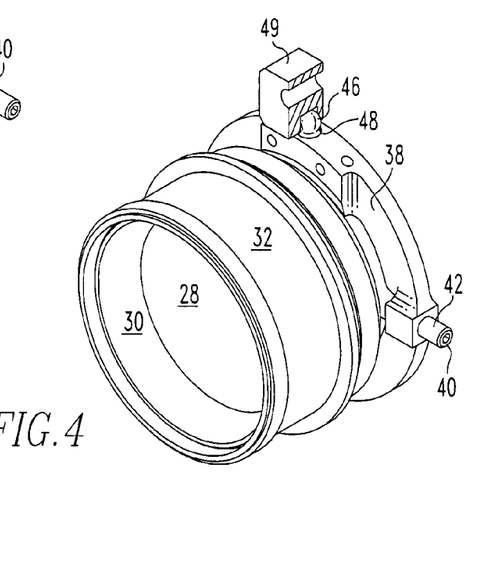
FIG. 4 is an isometric front and side view of a focusing assembly for a night sight according to the present invention.

Referring to FIGS. 2 to 4, the focusing assembly 26 includes at least one focus lens 28 mounted within a focus lens tube 30. The focus lens tube 30 is slidably mounted within a focus sleeve 32. The exterior surface 34 (FIG. 3) of the focus lens tube 30, and the internal surface 36 (FIG. 3) of the focus sleeve 32, are finished to a sufficiently smooth finish to facilitate the sliding of the focus lens tube 30 within the focus sleeve 32. The clearance between the focus lens tube 30 and focus sleeve 32 is minimized to limit the possible tilt of the focus lens tube. Additionally, the focus lens tube 30 and focus sleeve 32 are sufficiently long so that the range of possible tilt is minimized for a given clearance between the focus lens tube 30 and focus sleeve 32. The focus lens 28 preferably is a low diopter lens, thereby decreasing the sensitivity of the focusing assembly 26 to tilt, rotation, or decentration of the focus lens 28. A focus gimbal 38 is secured to the focus lens tube 30, preferably by a pair of pivot screws 40 passing through apertures 42 located on either side of the focus gimbal 38 and into apertures 42 defined within the focus lens tube 30. A pivot bearing 46 passes through an aperture 48 defined within the top of the focus gimbal 38. A linear actuator 49, which may be a barrel cam or unconstrained threaded member, defines a pivot bearing aperture 51 for receiving the pivot bearing 46, and a horizontal aperture 53, which may be threaded, for interacting with exterior focusing controls in a well-known manner. A horizontally fixed post 50 is secured within an aperture 52 defined within the bottom of the focus gimbal 38, also bearing against the surface of the focus lens tube 30 to secure the focus lens tube 30 within the focus gimbal 38. This method of attachment of the focus gimbal 38 to the focus lens tube 30 ensures that linear motion of the focus gimbal 38, controlled by the interaction of exterior focusing controls with the linear actuator 49, is transferred to the focus lens tube 30 without rotating, tilting, or decentering the focus lens tube.

Figure 5:
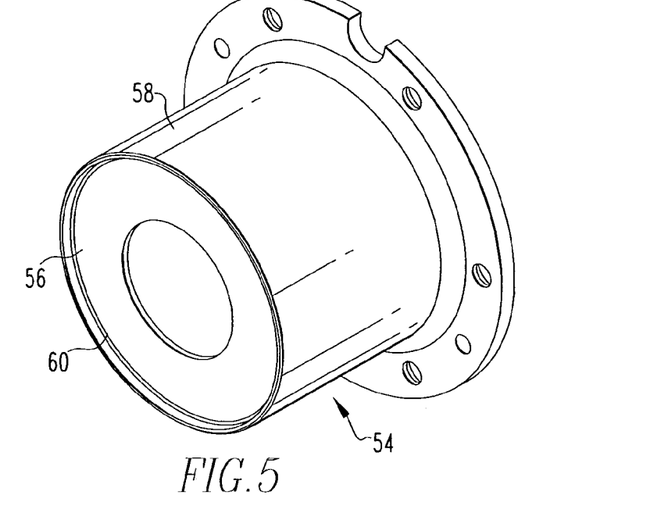
FIG. 5 is a front and side isometric view of an image intensifier and mount for use with a night sight of the present invention.
Figure 6:
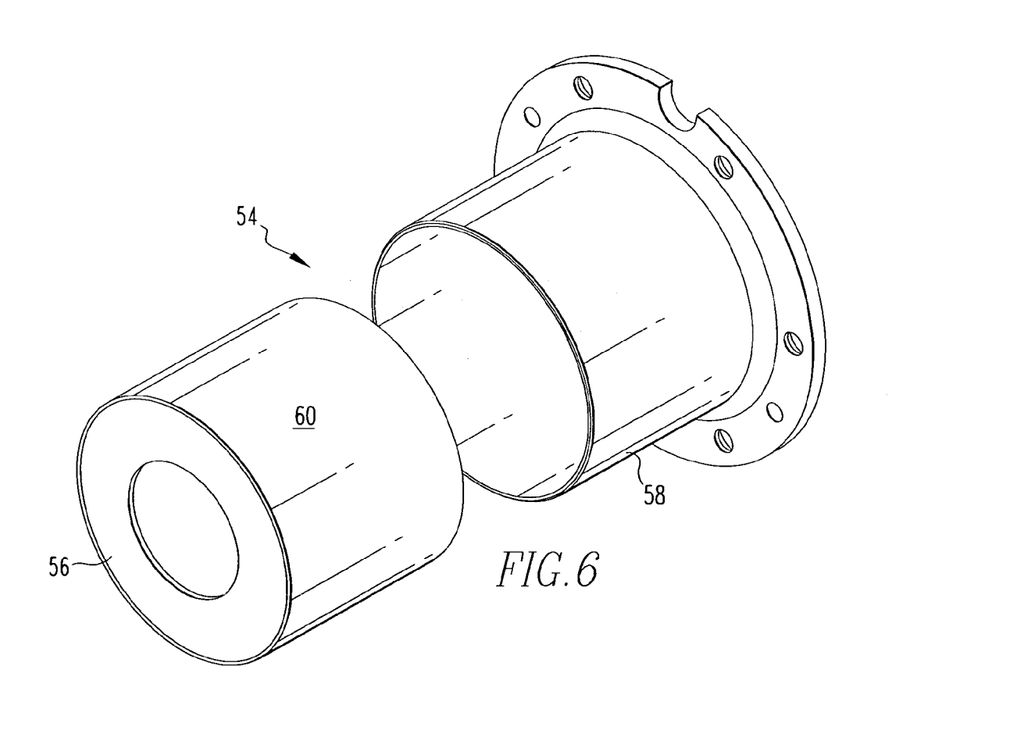
FIG. 6 is an exploded isometric front and side view of an image intensifier and mount for use with a night sight according to the present invention.

An image intensifier assembly 54 is located behind the focusing assembly 26. Referring to FIGS. 2 and 5 to 6, the image intensifier assembly 54 includes an image intensifying sensor/display combination 56 held within an image intensifier mount 58. A preferred image intensifying sensor/display combination is a presently available image intensifier, but other alternative devices with which the invention may be used include uncooled detector arrays, lead salt detector arrays, short wave infrared detector arrays, visible band charge coupled display (CCD) arrays, and intensified CCD or CMOS arrays having direct, fiber, or optical coupling. Such indirect view-devices may have displays which are, for example, LCD displays or OLED displays. The structure and functioning of an image intensifier 56 or other similar device is well known, and therefore only briefly described herein. A thin elastomer 60 surrounds the image intensifier 56. The elastomer 60 permits the image intensifier 56 to be tightly secured within the image intensifier mount 58, thereby resisting movement of the image intensifier 56 resulting from shock or temperature change, while also distributing the high mounting forces over the entire surface area of the image intensifier 56, thereby resisting deformation of the image intensifier 56 over time from these high forces. The elastomer 60 further provides a degree of shock absorbance, thereby protecting the shock sensitive equipment within the image intensifier 56. Additionally, the elastomeric suspension of the image intensifier 56 within the image intensifier mount compensates for different coefficients of thermal expansion within the materials used for the image intensifier 56 and mount 58, returning the image intensifier 56 in its desired position despite expansion and contraction of the components.

A variety of elastomers 60 can be used to suspend the Image Intensifier 56 within the mount 58. Some examples include polysulfide, one-part or two-part liquid or paste silicones, epoxies, ethylene propylene diene rubber (EPDN), acrylonitrile-butadiene rubber (NBR), hydrogenated acrylonitrile-butadiene rubber (HNBR), chlorobutadiene rubber (CR), carboxylated nitrile rubber (XNBR), acrylate rubber (ACM), ethylene acrylic rubber (AEM), methyl polysiloxane (MQ), vinyl-methyl polysiloxane (YMQ), phenyl-vinyl-methyl polyiloxane (PVMQ), phenyl-methyl polysiloxane (PMQ), fluoromethyl polysiloxane (FVMQ), fluoro elastomer (FKM), perfluoro elastomer (FFKM), polyester-urethane rubber (AU), polyether-urethane rubber (EU), ethylene-oxide-epichlorhydrin rubber (ECO), polyepichlorohydrine (CO), chlorosulphonated polyethylene (CSM), natural rubber (NR), isoprene rubber (IR), polybutadiene rubber (BR), styrene-butadiene rubber (SBR), ethylene propylene copolymer (EPM), butyl rubber (IIR), chlorobutyl rubber (CIIR), and brominebutyl rubber (BIIR).

Figure 7:
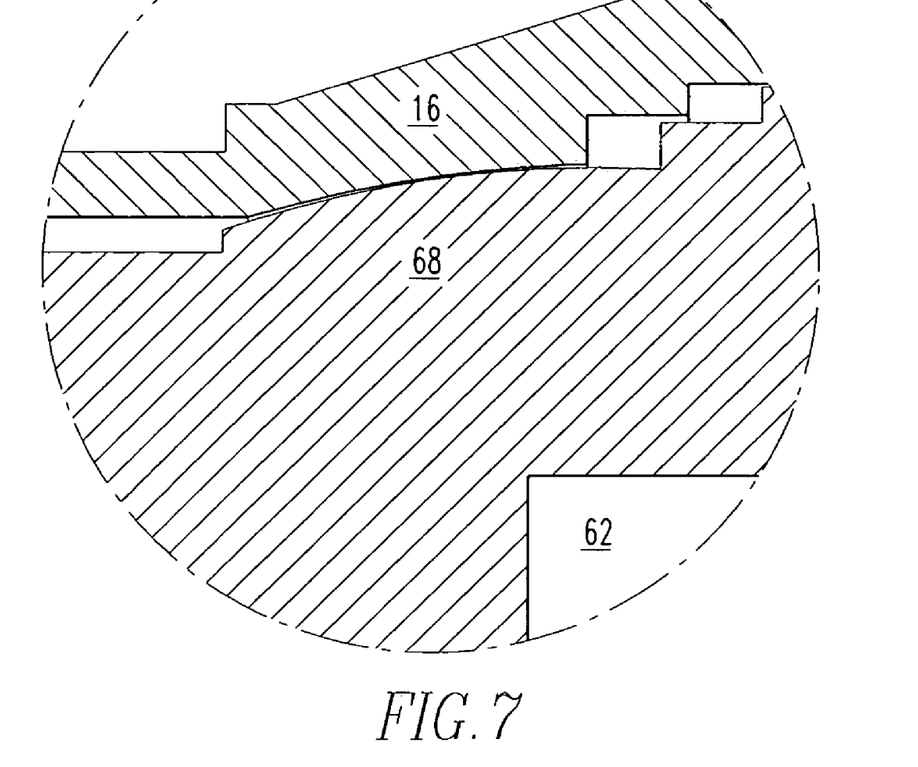
FIG. 7 is a cross-sectional side view of the circled area in FIG. 2.

A collimator 62 is located behind the image intensifier assembly 54, and directly ahead of the sealing window 64 located at the backend 14 of the housing 16. Collimators are well known in the art, and therefore not described in detail herein. The front end of the collimator 62 includes a focal length adjust lens 66. The focal length adjust lens 66 is positioned during assembly of the collimator 64 to adjust the focal length of the collimator 64 to match the focal length of the objective lens 18. A spherical bearing 68 is installed within the housing so that its center is centered at the center of curvature of the inverting fiber optic output display 61. The collimator 64 is fitted within the spherical bearing 68 so that the angle at which the displayed image appears to emerge from the collimator 64 is the same angle at which the image enters the objective lens 18. The interaction of the spherical bearing 68, collimator 64, and housing 16 is best illustrated in FIG. 7.

Figure 8:
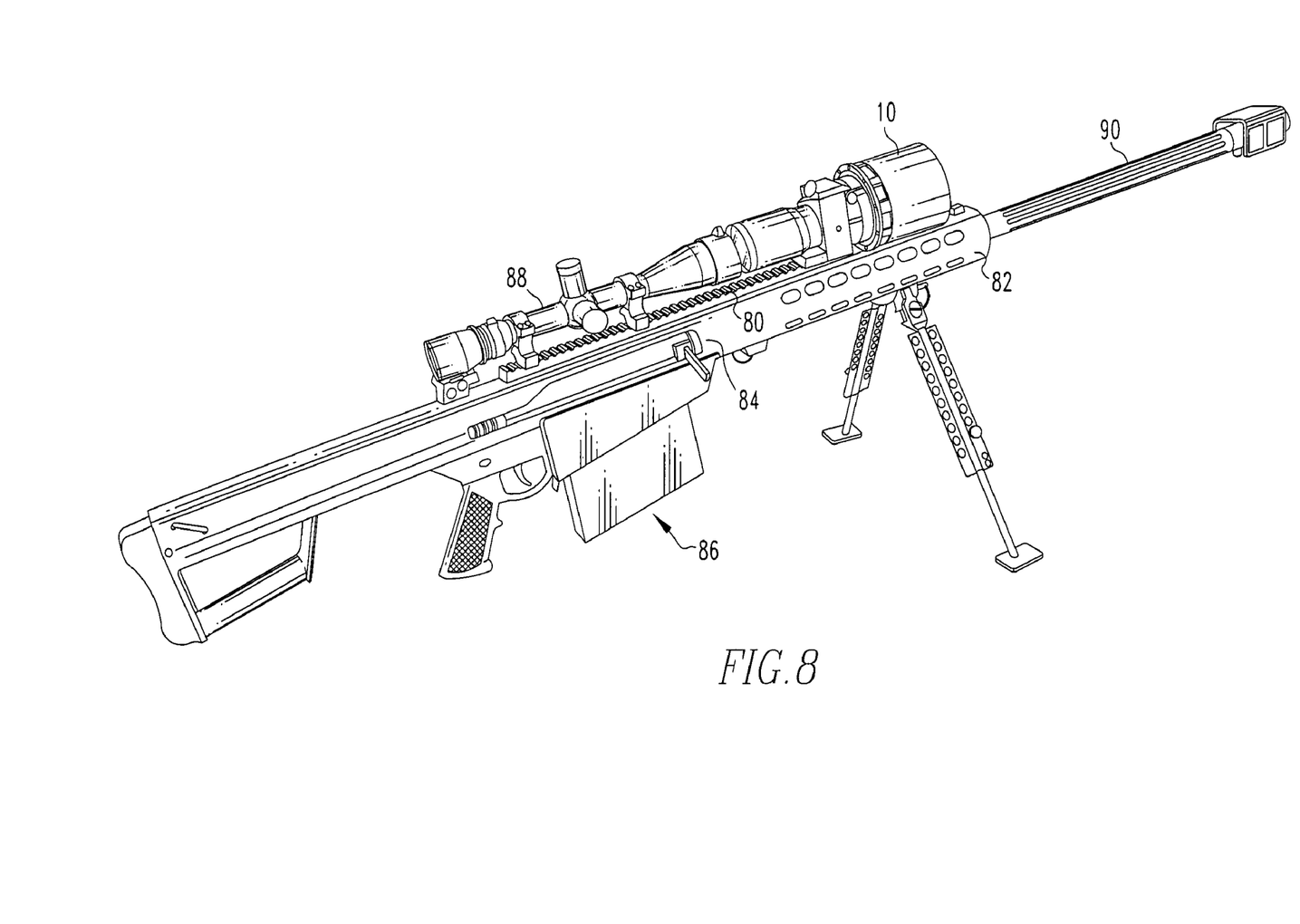
FIG. 8 is an isometric side view of a rifle utilizing a night sight of the present invention.

Referring to FIGS. 1 and 8, the bottom of the housing 16 includes a mount 70 having a fixed mounting rail 72 on one side, and a mounting lever 74 on the opposing side. The mounting lever 74 includes a projection 76 that, when the mounting lever 74 is in its rearward position as shown in FIG. 1, extends towards the fixed mounting rail 72, and which extends away from the fixed mounting rail 72 when the mounting lever 74 is in a forward position. A travel limiting block 78 extends downward from the mount 70, between the fixed mounting rail 72 and the mounting lever 74. It will become apparent to those skilled in the art that the mount 70 is structured to secure the night sight 10 to a universal sighting rail such as the Weaver Rail 80 (FIG. 8) that extends across the top of the forestock 82 and receiver 84 of the rifle 86. The fixed mounting rail 72 fits underneath one side of the universal sight rail 80, and the projection 76 fits under the other side when mounting level 74 is in its rearward position. The travel limiting block 78 fits within one of a plurality of slots along the universal sight rail 80, thereby restraining forward and backward movement of the night sight 10 when the night sight 10 is clamped to the universal sight rail 80.

In use, the night sight 10 is mounted to the universal sight rail 80 of the rifle 86, possibly in front of the telescopic daytime sight 88 that is also mounted to the universal sight rail 80. Although preferred embodiments of the night sight 10 are intended for use in conjunction with a telescopic daytime sight 88, those skilled in the art will recognize that the night sight 10 could be equipped with its own reticle, and thereby used independently of the telescopic daytime sight 88. The cutaway section 20 within the objective lens 18 and corresponding cutaway section 22 within the housing 16 permits the night sight 10 to be mounted with its center line relatively close to the center line of the barrel 90 of the rifle 86, and along substantially the same center line as the daytime telescopic sight 88. As a result, the correlation between the point of aim and point of impact is unchanged by the addition or removal of the night sight 10 in front of the daytime telescopic sight 88. Further, the night sight does not introduce any parallax which would require resighting the rifle 86, or changing the point of aim. The low center line of the night sight 10 also reduces the cross-sectional area visible to a downrange observer, and minimizes the extent to which a shooter must expose his head while aiming the rifle 86, the combination of which makes the shooter a more difficult target.

As a shooter is aiming the rifle 86, light will pass through the objective lens 18, next passing through the focusing lens 28. The focus lens 28 brings the image into sharp focus on the photocathode at the front of the image intensifier 56. The photocathode converts the image to an electrical image, which is intensified as the electrons forming the image travel through various electromagnetic fields that focus the electrons, resulting in acceleration of the electrons. The electrons are amplified by a microchannel plate and proximity focused to a phosphor screen. The amplified electronic image is then converted back to an optical image. The last step within the image intensifier is the inverting fiber optic output display 61, which displays the image to the collimator 62. As the image passes through the collimator 62, it is made to appear as though it originated a long distance away. The final intensified image is presented to the shooter as appearing to originate from substantially the same angle at which the image entered the objective lens 18. A night sight of the present invention can be constructed in a manner so that it introduces no more than 1 minute of angle error into aiming.

The present invention therefore provides a night sight having a large objective lens for maximum light gathering that may be mounted with a center line close to the center line of the barrel of a weapon. The invention has further provided a night sight having a large objective lens, with a cutaway section that permits the night sight to be mounted so that its center line is substantially the same as the center line of a daytime telescopic sight with which the night sight is used. The night sight of the present invention has minimized sensitivity to tilt, decenter, and rotation of the focusing mechanism. The mass within the focus assembly that must be moved to focus the night sight 10 has been minimized. The mounting of the image intensifier tube and collimator further ensures that the image is presented to the shooter at the proper angle. The night sight of the present invention has minimized the sensitivity to relative misalignment between the night sight and the daytime telescopic sight.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A night sight for a firearm, comprising a housing having an objective lens secured therein, the housing and objective lens each defining a bottom portion, the bottom portion of the housing and of the objective lens defining a cutout section therein, the cutout section extending generally parallel to a longitudinal axis of the night sight, wherein the lens is selected from the group consisting of Catadioptric, reflective, or refractive.

2. The night sight according to claim 1, wherein the objective lens is mounted within the housing by a plurality of axial sealing screws.

3. The night sight according to claim 1, further comprising a mount secured to the bottom portion of the housing, the mount being structured to secure the night sight to a firearm, the mount and the housing being structured to locate a centerline of the night sight along generally the same centerline as a telescopic daytime sight also mounted on the firearm.

4. The night sight according to claim 1, further comprising:
 an image intensifying sensor/display combination having an exterior surface;
 an image intensifier mount; and
 an elastomer between the sensor/display combination and image intensifier mount, the elastomer distributing mounting forces from the image intensifier mount over substantially the entire exterior surface of the sensor/display combination.

5. The night sight according to claim 4, wherein the sensor/display combination is selected from the group consisting of an image intensifier, or an uncooled infrared detector array, a cooled infrared detector array, a lead salt detector array, a SWIR detector array, a visible band CCD array, and an intensified CCD or CMOS array having direct, fiber, or optical coupling.

6. The night sight according to claim 4, wherein the sensor/display combination has an output device selected from the group consisting of an inverting fiber optic output display, a LCD display, a micromirror array, a CRT, a plasma display, and an OLED display.

7. The night sight according to claim 1, further comprising:
 a housing;
 a collimator; and
 a spherical bearing disposed between the housing and the collimator; the spherical bearing being structured to permit adjustment of the angle of the collimator with respect to the housing.

8. The night sight according to claim 7:
 further comprising an image intensifying sensor/display combination secured within the housing adjacent to the collimator, the sensor/display combination being structured to transmit light to the collimator; and
 wherein the spherical bearing is centered at a center of curvature of an output display of the sensor/display combination.

9. A firearm, comprising:
 a barrel; and
 a night sight disposed above the barrel, the night sight having a housing having an objective lens secured therein, the housing and objective lens each defining a bottom portion, the bottom portion of the housing and of the objective lens defining a cutout section therein, the cutout section extending generally parallel to a longitudinal axis of the night sight, and being disposed adjacent to the barrel;
 whereby the longitudinal axis of the night sight is positioned closer to the barrel than would be possible absent the cutout section.

10. The firearm according to claim 9, wherein the night sight further comprises:
 an image intensifying sensor/display combination having an exterior surface;
 an image intensifier mount; and
 an elastomer between the sensor/display combination and image intensifier mount, the elastomer distributing mounting forces from the image intensifier mount over substantially the entire exterior surface of the sensor/display combination.

11. The firearm according to claim 9, wherein the night sight further comprises:
 a housing;
 a collimator; and
 a spherical bearing disposed between the housing and the collimator; the spherical bearing being structured to permit adjustment of the angle of the collimator with respect to the housing.

* * * * *

UNITED STATES PATENT AND TRADEMARK OFFICE
CERTIFICATE OF CORRECTION

| | | |
|---|---|---|
| PATENT NO. | : 7,051,469 B1 | Page 1 of 1 |
| APPLICATION NO. | : 11/011671 | |
| DATED | : May 30, 2006 | |
| INVENTOR(S) | : Eugene Pochapsky et al. | |

It is certified that error appears in the above-identified patent and that said Letters Patent is hereby corrected as shown below:

Column 7, line 2, change "YMQ" to --VMQ--.

Signed and Sealed this

Twenty-ninth Day of August, 2006

JON W. DUDAS
*Director of the United States Patent and Trademark Office*